US008137020B2

(12) United States Patent
Leung et al.

(10) Patent No.: US 8,137,020 B2
(45) Date of Patent: Mar. 20, 2012

(54) COMPUTER-CONTAINED BINDER

(75) Inventors: Chee-Chun Leung, Taoyuan Shien (TW); Yuan-Chen Liang, Taoyuan Shien (TW); Chia-Hui Wu, Dalin Township, Chiayi County (TW); Yi-Chun Lin, Rueifang Township, Taipei County (TW)

(73) Assignee: Quanta Computer Inc., Taoyuan Shien (TW)

( * ) Notice: Subject to any disclaimer, the term of this patent is extended or adjusted under 35 U.S.C. 154(b) by 305 days.

(21) Appl. No.: 12/588,339

(22) Filed: Oct. 13, 2009

(65) Prior Publication Data

US 2010/0310303 A1 Dec. 9, 2010

(30) Foreign Application Priority Data

Jun. 8, 2009 (TW) ................................ 98210137 U

(51) Int. Cl.

| | |
|---|---|
| ***B42F 3/00*** | (2006.01) |
| ***B42F 13/00*** | (2006.01) |
| ***B42F 13/12*** | (2006.01) |
| ***B42F 13/40*** | (2006.01) |
| ***G09B 5/00*** | (2006.01) |

(52) U.S. Cl. .............. 402/4; 402/80 R; 402/79; 434/317

(58) Field of Classification Search ................ 402/4, 79, 402/80 R; 434/317
See application file for complete search history.

(56) References Cited

U.S. PATENT DOCUMENTS

| | | | | |
|---|---|---|---|---|
| 5,109,354 | A * | 4/1992 | Yamashita et al. | 708/110 |
| 5,219,239 | A * | 6/1993 | Bianco | 402/79 |
| 5,295,758 | A * | 3/1994 | Bianco | 402/79 |
| 5,476,336 | A * | 12/1995 | Osiecki et al. | 402/79 |
| 5,876,144 | A * | 3/1999 | Bedol et al. | 402/4 |
| 7,540,379 | B2 * | 6/2009 | Yau | 206/320 |
| 7,854,319 | B2 * | 12/2010 | Yau | 206/320 |

* cited by examiner

*Primary Examiner* — Edward Tolan
*Assistant Examiner* — Kyle Grabowski
(74) *Attorney, Agent, or Firm* — Rabin & Berdo, PC

(57) ABSTRACT

A computer-contained binder provided in the disclosure has a document binder and a computer device. The document binder having at least one cover and plural parallel folder rings piercing through an edge of the cover. The computer device has a main body, a column-shaped battery portion pierced through by all of the parallel folder rings, and two shafts. Each shaft respectively pivots the column-shaped battery portion and the main body at two opposite end of the shaft.

9 Claims, 3 Drawing Sheets

COMPUTER-CONTAINED BINDER

RELATED APPLICATIONS

This application claims priority to Taiwan Application Serial Number 98210137, filed Jun. 8, 2009, which is herein incorporated by reference.

BACKGROUND

1. Field of Invention

The present disclosure relates to a document binder, and more particularly to a computer-contained binder.

2. Description of Related Art

Nowadays, paper notebooks on the market, such as organizers with paper format sizes such as A3, A4, A5, B4, and B5, and allow users (i.e. salesmen or students) to write on papers instantly. However, one of drawbacks for paper notebooks is that paper notebooks cause paper trash problems.

On the other hand, as computer products on the market becomes level up, but cheaper, these computer products are easy to enter people's life, for example, people usually use computer product as a word processing tool in theirs offices or families.

Furthermore, because a laptop computer is easy to carry, people trend to have one instead of a desktop computer. Also, computer companies put the laptop computer and a paper notebook together for a product to help users to record information by typing rather than writing.

However, since the format size of a laptop computer and that of paper notebooks are not the same, the laptop computer may be lost when the laptop computer is detached from the paper notebook.

Meanwhile, even when the laptop computer and the paper notebook are integrated together, it might be inconvenient and trouble how to place the laptop computer properly on the right hand side or the left hand side of the paper notebook.

SUMMARY

A computer-contained binder is provided in this disclosure.

The computer-contained binder comprises a document binder and a computer device. The document binder has at least one cover and some parallel folder rings piercing through an edge of the cover. The computer device comprises a main body, a column-shaped battery portion, and two shafts. The column-shaped battery portion is pierced through by all of the parallel folder rings, and coupled with the document binder. Each shaft has a first end thereof and a second end thereof. The first end and the second end are opposite to each other. The first ends of the shafts are respectively pivoted at two opposite ends of the column-shaped battery portion, and the second ends of the shafts are respectively pivoted at two opposite sides of the main body.

In an embodiment, each shaft has a first pivot, a second pivot and a connection part. The first pivot is disposed on the first end of the shaft. The second pivot is disposed on the second end of the shaft. The connection part respectively connects the first pivot and the second pivot at two opposite ends thereof.

Thus, the main body can be carried to move by rotating the shafts along a circumference surface of the column-shaped battery portion, or rotating the main body itself to approach or leave away from the column-shaped battery portion.

Also, the main body can be a panel computer having a touch panel and a camera. The panel computer is electrically connected the column-shaped battery portion via at least one shaft.

The column-shaped battery portion comprises a flange and plural through-holes. The flange is disposed on the circumference surface of the column-shaped battery portion, and is parallel to a virtual centerline between the opposite ends of the column-shaped battery portion. The through-holes are arranged linearly on the flange, and are respectively pierced through by one of the parallel folder rings.

The cover has a size substantially matching paper formats A3, A4, A5, B4 or B5, and the parallel folder rings vary in number and in the way they are arranged with respect to the size of the cover.

When the size of the cover matches one of the paper formats, the size of the cover is substantially the same as the main body. Meanwhile, the through-holes provide the parallel folder rings of more than two sizes of the paper formats of the cover to pierce.

By combining the document binder and the computer device, the computer-contained binder is able to reduce possibilities of parting the computer device from the document binder and then losing the computer device.

By combining the document binder and the computer device, the computer-contained binder is able to provide more than one position that the computer device is placed aside the document binder for facilitating a user to read.

By combining the document binder and the computer device, the computer-contained binder is able to place the computer device on either the right or the left hand side of the binder to facilitate both right and left-handed users.

It is to be understood that both the foregoing general description and the following detailed description are examples, and are intended to provide further explanation of the disclosure as claimed.

BRIEF DESCRIPTION OF THE DRAWINGS

These and other features, aspects and advantages of the present disclosure will become better understood with regard to the following description, appended claims and accompanying drawings where:

DESCRIPTION OF THE PREFERRED EMBODIMENTS

Figure 1:
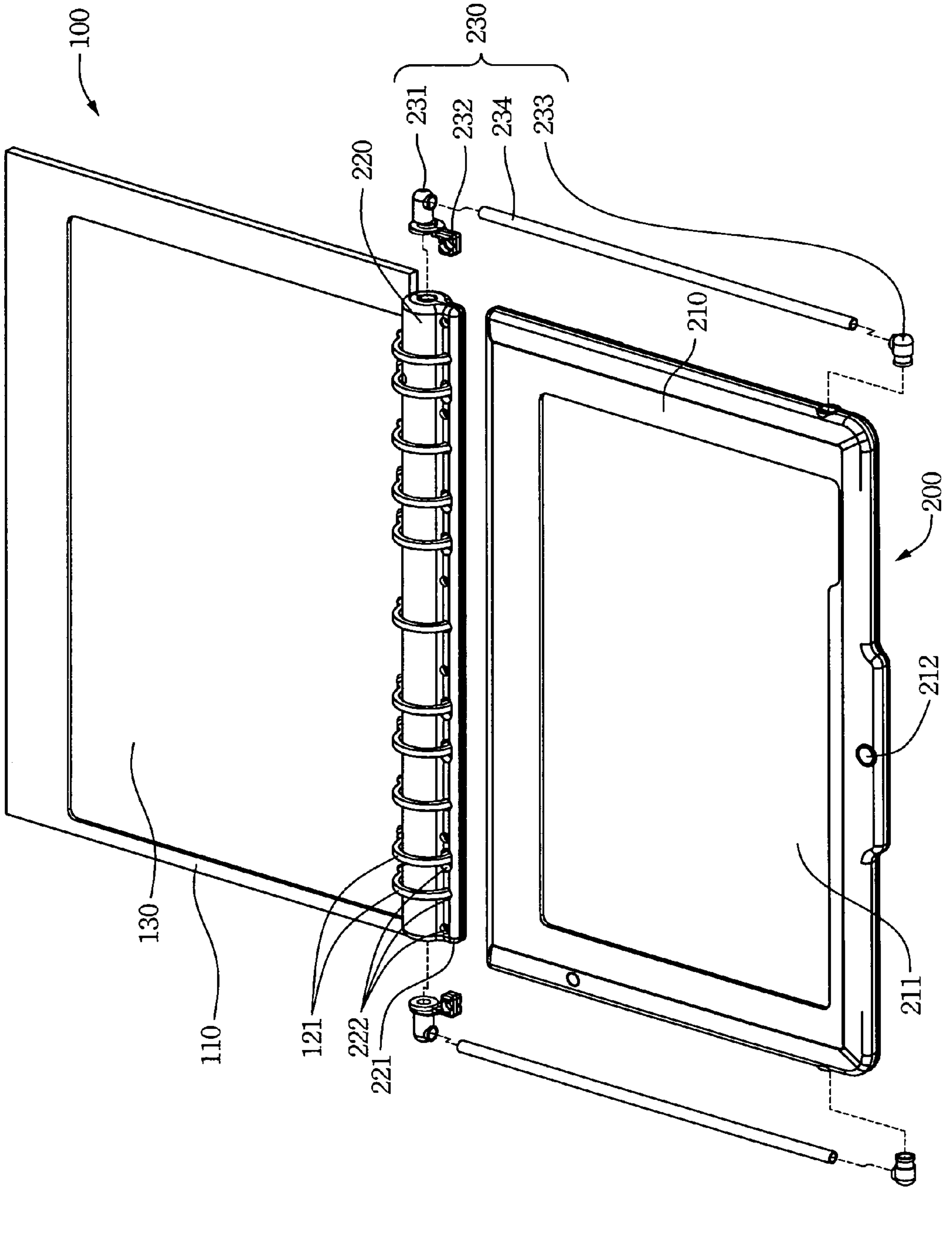
FIG. 1 is an exploded view of a computer-contained binder according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
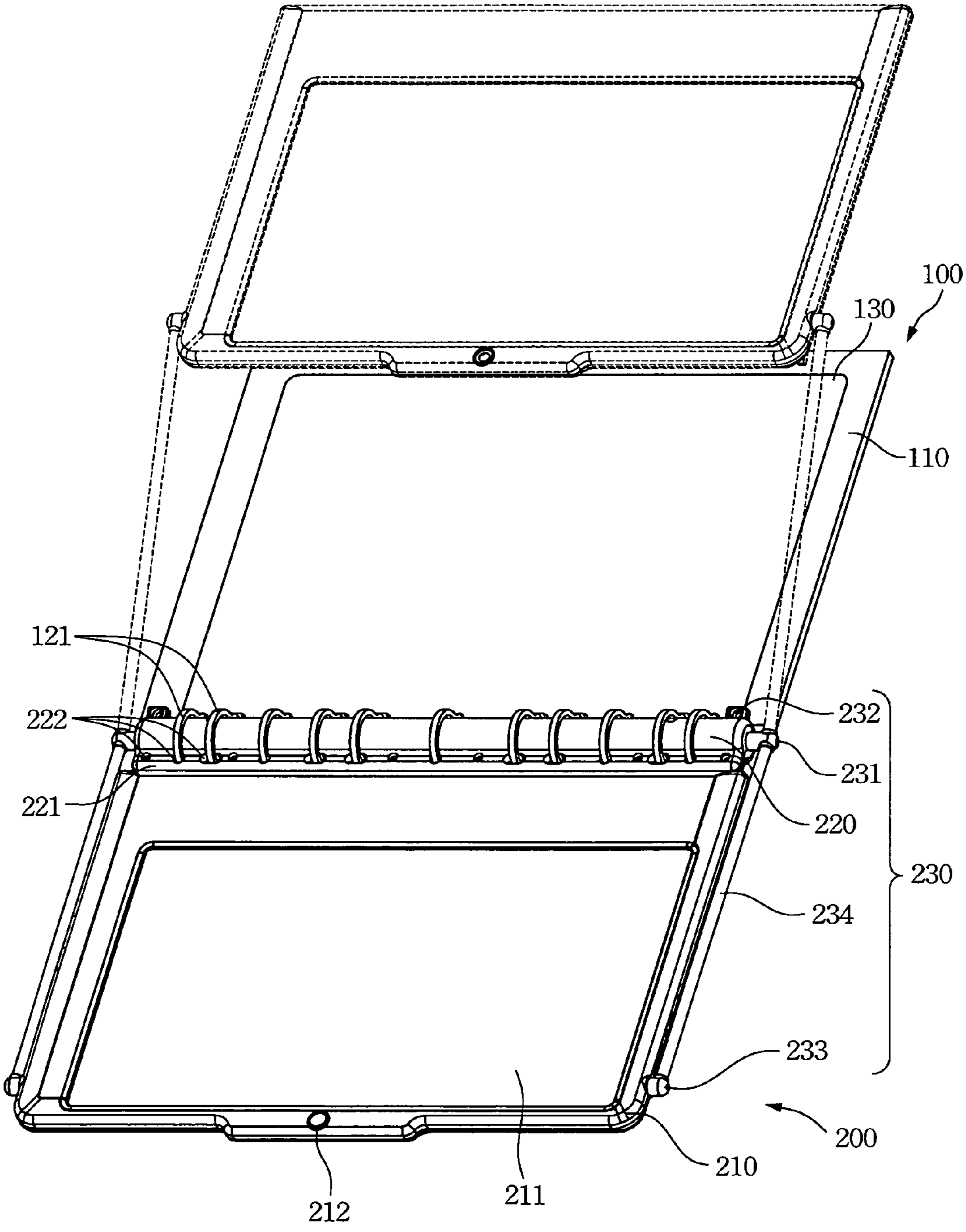
FIG. 2 is an operational view of the computer-contained binder according to an embodiment of the disclosure.
Figure 3:
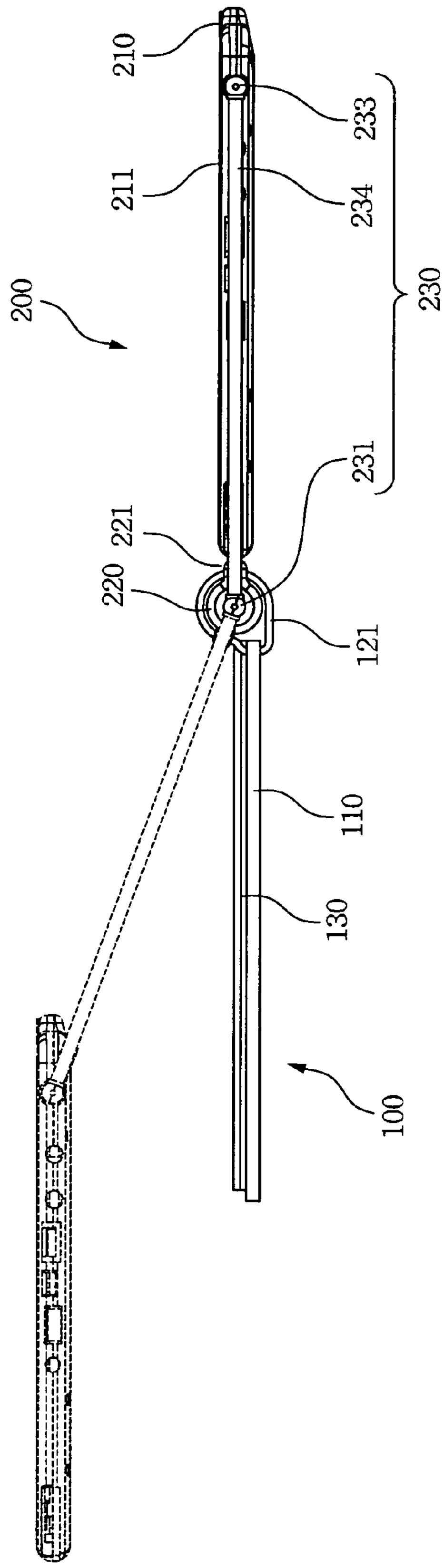
FIG. 3 is a side view of FIG. 2.

Refer to FIG. 1 to FIG. 3. FIG. 1 is an exploded view of a computer-contained binder according to an embodiment of the disclosure. FIG. 2 is an operational view of the computer-contained binder according to an embodiment of the disclosure. FIG. 3 is a side view of FIG. 2.

A computer-contained binder is provided in this disclosure. By combining a computer device 200 and a document binder 100, the computer-contained binder reduces the possibility that the computer device 200 and the document binder 100 are separated and makes it less likely to lose the computer device 200.

The document binder 100 has at least one cover 110 and some parallel folder rings 121. These parallel folder rings 121 are arranged linearly along an edge of the cover 110, and simultaneously pierce through the same edge of the cover 110. Thus, all inner openings of the parallel folder rings 121 are aligned with each other. These parallel folder rings 121 collect contents together such as loose-leaf papers, loose-leaf page type plastic bags, and books with matched holes thereon by piercing through the holes of the contents.

Here, the document binder 100 for example, can be a paper notebook, a book, an organizer or a calendar. The parallel folder rings 121 are not limited to a breakable or unbreakable type only, and are not limited to circle shaped or non-circle shaped rings.

The computer device 200 comprises a main body 210, a column-shaped battery portion 220, and two shafts 230. The main body 210, for example, is a panel computer. The panel computer has a touch panel 211 and a camera 212, and the panel computer is electrically connected the column-shaped battery portion 220 via at least one of the shafts 230. The column-shaped battery portion 220, for example, has a column-shaped outer case and at least one battery module set in the column-shaped outer case. The column-shaped battery portion 220 is pierced through by all parallel folder rings 121, and coupled with the document binder 100. The shafts 230 respectively has a first end thereof and a second end thereof, which are opposite with each other. The first ends of the shafts 230 are respectively pivoted at two opposite ends of the column-shaped battery portion 220, and the second ends of the shafts 230 are respectively pivoted at two opposite sides of the main body 210.

The column-shaped battery portion comprises a flange 221 and plural through-holes 222. The flange 221 is disposed on a circumference surface of the column-shaped battery portion, and is parallel to a dotted centerline between the two opposite ends of the column-shaped battery portion 220. The through-holes 222 are arranged linearly on the flange 221, and are respectively pierced through by one of the parallel folder rings 222.

No matter the column-shaped battery portion 220 simultaneously goes through the parallel folder rings 222, or the column-shaped battery portion 220 is out of the parallel folder rings 222, the column-shaped battery portion 220 is still coupled with the document binder 100.

The cover 110 of the document binder 100 has a size substantially matching the paper formats A3, A4, A5, B4 or B5, and the parallel folder rings 121 vary in number and in the way they are arranged with respect to the size of the cover 110. Thus, when the size of the cover 110 matches one of the paper formats above, the size of the cover 110 is substantially same as the main body 210. When the document binder 100 is the size of A3, A4, A5, B4 or B5 paper, the size of the cover 110 is substantially same as the main body 210. Meanwhile, the through-holes 222 match the parallel folder rings 121 of the document binder 100 with more than two kinds of the sizes of the paper formats.

Therefore, as the main body 210 is sized similar to the cover 110, the computer device 20 will fit in the document binder 100, rather than exposure from the document binder 100. Thus, the computer device 200 can be combined into the document binder 100 properly.

In an embodiment, refer to FIG. 1 again, each shaft 230 has a first pivot 231, a second pivot 233 and a connection part 234. The first pivot 231 is disposed on the first end of the shaft 230, and has a stopping block 232. The stopping block 232 is disposed on the first pivot 231, and is served to lean against one side of the column-shaped battery portion 220. The second pivot 233 is disposed on the second end of the shaft 230. The connection part 234 respectively connects the first pivot 231 and the second pivot 233 at two opposite ends of the shaft 230.

Thus, the main body 210 of the computer device 200 can be carried to move on a right hand side of the column-shaped battery portion 220 or a left hand side of the column-shaped battery portion 220 by rotating the first pivot 231 of the shafts 230 along the circumference surface of the column-shaped battery portion 220. Or, the main body 210 of the computer device 200 can be rotated towards or away from the column-shaped battery portion 220.

Thus, the computer-contained binder provides more than one position which the computer device 200 can be placed on the right-hand side or the left-hand side right side of the cover 110 of the document binder 100 for a user to read.

Refer to FIG. 2 and FIG. 3 again. When a user has a right-handed writing habit, the user may rotate the first pivot 231 to move the main body 210 on the left hand side of the column-shaped battery portion 220 for writing paper on the document binder, at the time, the user may further rotate the main body 210 itself by the second pivot 233 to use the touch panel 211. On the other hand, when, a user is left-handed, vice versa. Thus, the computer-contained binder provides to place the computer device 200 on either right or left hand side of the binder for facilitating a user who has a right or left handed writing habit to write.

Furthermore, the stopping block 232 of the first pivot 231 may lean against the flange 221 for avoid the main body 210 rotating continually.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A computer-contained binder, comprising:

a document binder having at least one cover and plural parallel folder rings piercing through an edge of the cover; and a computer device comprising:

a main body;

a column-shaped battery portion pierced through by all of the parallel folder rings to be coupled with the document binder; and two shafts respectively having a first end thereof and a second end opposite to the first end thereof, wherein each of the shafts comprises:

a first pivot disposed on the first end of each shaft, such that the first ends of the two shafts are respectively pivoted at two opposite ends of the column-shaped battery portion;

a second pivot disposed on the second end of each shaft, such that the second ends of the two shafts are respectively pivoted at two opposite sides of the main body; and a connection part connecting the first pivot and the second pivot at two opposite ends thereof.

2. The computer-contained binder of claim 1, wherein the column-shaped battery portion comprises:

a flange disposed on a surface of the column-shaped battery portion, and being parallel to a centerline between the opposite ends of the column-shaped battery portion; and plural through-holes arranged linearly on the flange, and respectively pierced through by one of the parallel folder rings.

3. The computer-contained binder of claim 2, wherein the cover has a size substantially matching paper formats A3, A4, A5, B4 or B5, and the parallel folder rings are varied in different number and in different arrangements with respect to the size of the cover, and the through-holes provide the parallel folder rings of more than two sizes of the paper formats of the cover to pierce.

4. The computer-contained binder of claim 3, wherein a size of the main body is substantially matched the size of the cover of the document binder.

5. The computer-contained binder of claim 1, wherein a stopping block disposed on the first pivot served to lean against one side of the column-shaped battery portion.

6. The computer-contained binder of claim 1, wherein the column-shaped battery portion is electrically connected the main body via at least one of the shafts.

7. The computer-contained binder of claim 1, wherein the main body is a panel computer.

8. The computer-contained binder of claim 1, wherein the document binder is a paper notebook, a book, an organizer or a calendar.

9. The computer-contained binder of claim 1, wherein the column-shaped battery portion comprises:

a column-shaped outer case; and at least one battery module set in the column-shaped outer case.

* * * * *